(No Model.)

G. D. MILES.
ADJUSTABLE DUST PAN.

No. 469,709. Patented Mar. 1, 1892.

Attest:
Geo. T. Smallwood.
L. Bursley

Inventor:
Geo. D. Miles.
By H. J. Ennis
Atty.

UNITED STATES PATENT OFFICE.

GEORGE DAVIS MILES, OF BIG RAPIDS, ASSIGNOR TO ETHELBERT CROFTON FOX, OF GRAND RAPIDS, MICHIGAN.

ADJUSTABLE DUST-PAN.

SPECIFICATION forming part of Letters Patent No. 469,709, dated March 1, 1892.

Application filed June 9, 1891. Serial No. 395,649. (No model.)

*To all whom it may concern:*

Be it known that I, GEORGE DAVIS MILES, a citizen of the United States, residing at Big Rapids, in the county of Mecosta and State of Michigan, have invented certain new and useful Improvements in Adjustable Dust-Pans; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to dust-pans for household use, and more particularly to that class provided with a hinged bail having a handle extending upwardly for convenient manipulation of said pan while it is on the floor and while the operator is in a standing position; and to these ends the novelty consists in a pan of the class described provided with an adjustable apron operated by a bail provided with an upward extension of a sufficient length to allow of the manipulation of the pan and apron while the operator is in a standing position, as will be hereinafter more fully described, and particularly pointed out in the claims.

Figure 1:
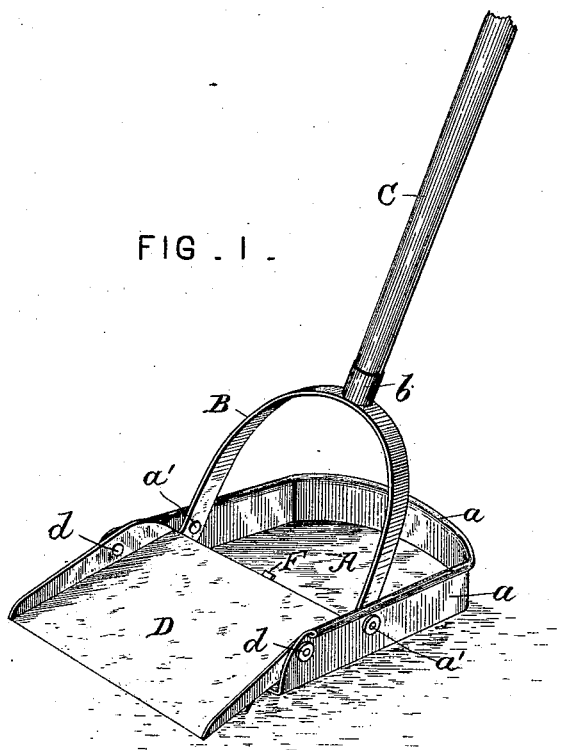
Figure 2:
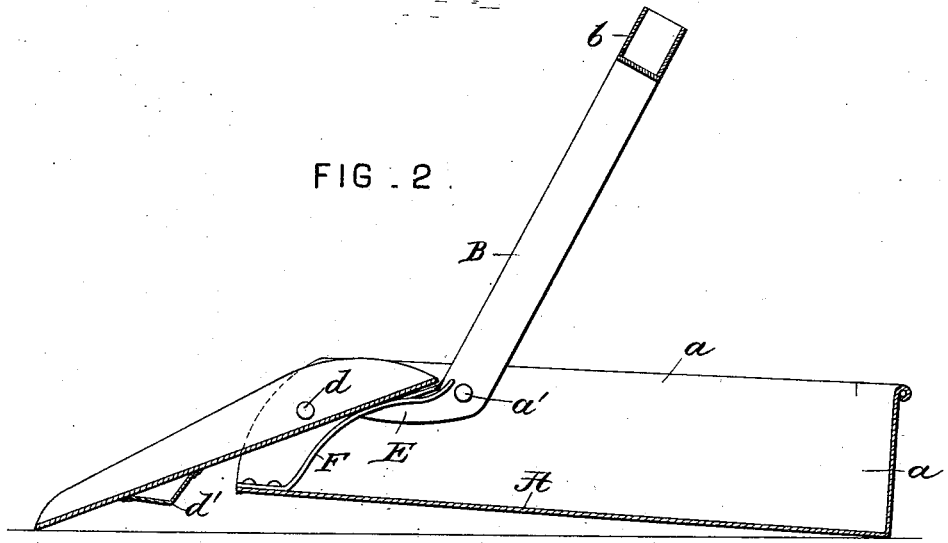

Figure 1 is a view in perspective of my improved dust-pan, and Fig. 2 is a longitudinal section of the same.

A is the dust pan or receptacle proper and is provided on two sides with retaining-flanges *a*.

B is the bail and is conveniently pivoted to the side flanges *a* by rivets *a' a'*, and the upper portion of the bow of this bail is provided with a socket *b*, in which is secured a wooden handle C, extending upwardly a sufficient distance to be readily manipulated by the hand of the operator while in a standing position, thus obviating the necessity of resorting to a tiresome stooping or bending over during the operation of sweeping.

D is an adjustable apron hinged to the flanges *a* of the pan A by rivets *d d*, and the under side of said apron is provided with a stiffening-brace *d'*, which transversely supports and strengthens the apron.

The lower ends of the bail B are provided with angular extension-levers E, which project under the rear end of the apron D, and when the handle C is approximately vertical the levers E tilt the rear end of the apron upward, thus throwing the front end down and holding it into close contact with the carpet or floor, in which position the dust or dirt is swept up over the apron into the pan proper, thus effectually preventing any particles getting under the apron, thus securing a "clean sweep." After this operation is accomplished the handle may be tilted forward and the forward part of the apron tilted upward to prevent the escape of the contents of the pan until it is removed and emptied; also, apron D to be held to floor by spring F, fastened underneath it and acting upon apron D in same manner as levers E E.

Having thus fully described my invention, what I claim as new and useful, and desire to secure by Letters Patent of the United States, is—

1. The combination, with the pan A, provided with the bail B, having handle C, of the apron D, hinged to the front end of said pan, and the spring F, secured to the pan so that its free end forces the forward or front end of said apron to the floor, as and for the purpose set forth.

2. The combination, with the pan A, provided with the pivoted bail B, having handle C and angular extension-levers E, of the hinged apron D, adapted to be operated by the action of the handle C, substantially as set forth.

In testimony whereof I affix my signature in presence of two witnesses.

GEORGE DAVIS MILES.

Witnesses:
 WALTER G. TUTTLE,
 F. EMERY TUTTLE.